United States Patent [19]

Kaiya

[11] Patent Number: 5,370,936
[45] Date of Patent: Dec. 6, 1994

[54] ORGANOPOLYSILOXANE COMPOSITION FOR THE FORMATION OF CURED RELEASE FILMS

[75] Inventor: Nobuo Kaiya, Chiba, Japan

[73] Assignee: Dow Corning Toray Silicone Co., Ltd., Tokyo, Japan

[21] Appl. No.: 95,326

[22] Filed: Jul. 21, 1993

[30] Foreign Application Priority Data

Jul. 30, 1992 [JP] Japan .................. 4-223250

[51] Int. Cl.$^5$ .................. B32B 9/04; B05D 3/02; C08L 83/00
[52] U.S. Cl. .................. 428/447; 428/452; 427/387; 427/391; 427/503; 427/515; 524/588; 524/731; 524/379; 524/268
[58] Field of Search .................. 524/588, 731, 379, 268; 428/447, 452; 427/387, 391, 503, 515

[56] References Cited

U.S. PATENT DOCUMENTS

| | | | |
|---|---|---|---|
| 4,562,096 | 12/1985 | Lo et al. .................. | 427/208.8 |
| 5,036,117 | 7/1991 | Chung et al. .................. | 522/172 |
| 5,064,916 | 11/1991 | Sasaki et al. .................. | 525/478 |
| 5,108,791 | 4/1992 | Chung et al. .................. | 427/208.8 |
| 5,125,998 | 6/1992 | Jones et al. .................. | 156/273.3 |
| 5,145,886 | 9/1992 | Oxman et al. .................. | 522/66 |

FOREIGN PATENT DOCUMENTS

| | | |
|---|---|---|
| 371405A2 | 6/1990 | European Pat. Off. . |
| 0491598A2 | 12/1991 | European Pat. Off. ...... C08L 83/04 |

Primary Examiner—Melvyn I. Marquis
Assistant Examiner—Karen A. Dean
Attorney, Agent, or Firm—Timothy J. Troy

[57] ABSTRACT

The release film-forming organopolysiloxane composition in accordance with the present invention is characterized by its ability to cure rapidly at relatively low temperatures not exceeding 100° C. to yield a cured film that is strongly adherent for the surface of various types of substrates (e.g., synthetic films, paper, polyethylene-laminated paper, etc.) and that also exhibits excellent release properties for tacky substances.

20 Claims, No Drawings

ORGANOPOLYSILOXANE COMPOSITION FOR THE FORMATION OF CURED RELEASE FILMS

BACKGROUND OF THE INVENTION

The present invention relates to an organopolysiloxane composition for the formation of cured release films (hereinafter referred to as a release film-forming organopolysiloxane composition).

Release film-forming organopolysiloxane compositions based on higher alkenyl (typically hexenyl)-containing organopolysiloxanes are already known. Because these compositions cure rapidly at relatively low temperatures not exceeding 100° C. to yield cured films that are highly releaseable with respect to tacky materials, such release film-forming organopolysiloxane compositions are useful for such applications as release paper, separation or anti-blocking paper, and so forth (such as those disclosed in Japanese Patent Application Laid-Open [Kokai or Unexamined] No. 2-145649 [145,649/90] and Japanese Patent Application Laid-Open [Kokai or Unexamined] No. 2-145650 [145,650/90]). However, compositions of this type are poorly adherent for various types of substrates, such as paper, synthetic films, polyethylene-laminated kraft paper, and so forth, and as a result the cured films afforded by such compositions will readily delaminate from these substrates. These compositions therefore cannot be used in some applications.

A composition whose crosslinking component comprises an organohydrogenpolysiloxane that contains at least 1 alkenyl group and at least 2 silicon-bonded hydrogen atoms in each molecule is disclosed in Japanese Patent Application No. 3-356079 [356,079/91]. In contrast, the present invention is directed to a composition that uses a special crosslinking component which cures even more rapidly and is also highly substrate-adherent.

SUMMARY OF THE INVENTION

The present invention relates to a release film-forming organopolysiloxane composition which comprises: (A) 100 weight parts of an organopolysiloxane that contains in each molecule at least 2 alkenyl groups having the general formula $H_2CH=CH-(CH_2)_n-$ wherein n has a value of from 2 to 8, (B) 1 to 200 weight parts of an organohydrogenpolysiloxane having at least 2 silicon-bonded hydrogen atoms and at least 1 alkyl group with the general formula $C_aH_{2a+1}$ in each molecule, wherein a has a value of from 4 to 10, (C) an addition-reaction inhibitor; and (D) a catalytic quantity of a platinum group metal catalyst. The composition can further comprise (E) 1 to 200 weight parts of a nonreactive organopolysiloxane.

Thus the present invention takes as its object the introduction of a release film-forming organopolysiloxane composition that cures rapidly at relatively low temperatures not exceeding 100° C. to afford a cured film that is highly adherent for various types of substrates and that is also highly releasing for tacky or sticky materials. These and other features, objects and advantages of the present invention will be apparent upon consideration of the following detailed description of the invention.

DETAILED DESCRIPTION OF THE INVENTION

To explain the preceding in greater detail, the organopolysiloxane comprising component (A) contains at least two alkenyl groups having the general formula $H_2C=CH-(CH_2)_n-$ in each molecule, and this organopolysiloxane forms the basis of the composition of the present invention. In the preceding formula, n has a value of from 2 to 8 and preferably has a value of 3 to 8. When n falls below 2, the composition of the instant invention will have a slow rate of cured film formation. On the other hand, it is difficult to synthesize this type of organopolysiloxane in which n exceeds 8. No specific restriction attaches to the degree of polymerization (DP) of this organopolysiloxane, and the organopolysiloxane can be used ranging from low-DP organopolysiloxane with a viscosity of 100 centipoise at 25° C. up to high-DP organopolysiloxane gums. The organopolysiloxane under consideration is exemplified by an organopolysiloxane having the following average unit formula $R_bSiO_{(4-b)/2}$. In the preceding formula, R is a substituted or unsubstituted monovalent hydrocarbon group and is nonexhaustively exemplified by alkyl groups such as methyl, ethyl, propyl, and butyl; alkenyl groups such as butenyl, pentenyl, hexenyl, and heptenyl; aryl groups such as phenyl, tolyl, and xylyl; and substituted alkyl groups such as 2-phenylethyl, 2-phenylpropyl, and 3,3,3-trifluoropropyl. Methyl preferably comprises at least 70 mole % of R from the perspective of the release properties, and b is a number with a value of 1.9 to 2.05. Furthermore, this organopolysiloxane may contain small quantities of silicon-bonded hydroxyl or alkoxy groups.

The component under consideration is specifically but nonexhaustively exemplified by dimethylbutenylsiloxy-terminated dimethylpolysiloxanes, dimethylpentenylsiloxy-terminated dimethylpolysiloxanes, dimethylhexenylsiloxy-terminated dimethylpolysiloxanes, dimethylheptenylsiloxy-terminated dimethylpolysiloxanes, dimethyloctenylsiloxy-terminated dimethylpolysiloxanes, trimethylsiloxy-terminated butenylmethylsiloxane-dimethylsiloxane copolymers, silanol-terminated butenylmethylsiloxane-dimethylsiloxane copolymers, trimethylsiloxy-terminated methylpentenylsiloxane-dimethylsiloxane copolymers, trimethylsiloxy-terminated hexenylmethylsiloxane-dimethylsiloxane copolymers, silanol-terminated hexenylmethylsiloxane-dimethylsiloxane copolymers, trimethylsiloxy-terminated methylheptenylsiloxane-dimethylsiloxane copolymers, trimethylsiloxy-terminated methyloctenylsiloxane-diemthylsiloxane copolymers, dimethylpentenylsiloxy-terminated methylphenylsiloxane-dimethylsiloxane copolymers, silanol-terminated methylpentenylsiloxane-dimethylsiloxane copolymers, dimethylhexenylsiloxy-terminated hexenylmethylsiloxane-dimethylsiloxane copolymers, and dimethylhexenylsiloxy-terminated diphenylsiloxane-dimethylsiloxane copolymers.

Component (B) of the present invention is a crosslinker for component (A) and comprises an organohydrogenpolysiloxane that contains at least 2 silicon-bonded hydrogen atoms and at least 1 alkyl group having the following general formula $C_aH_{2a+1}$ in each molecule. Component (B) also functions to provide the composition of the present invention with adherence for the surface of various types of substrates. In the preceding formula, a is to have a value of 4 to 10 for the following reasons: the improvement in adherence is inadequate at values below 4, while the synthesis of this component becomes problematic at values in excess of 10. It is preferred for purposes of the present invention that n have a value of 8. Furthermore, the alkyl group is preferably present at 2 to 50 mol % in each molecule.

The component under consideration is specifically but nonexhaustively exemplified by octyl-containing organohydrogenpolysiloxanes such as trimethylsiloxy-terminated methyloctylsiloxane-dimethylsiloxane-hydrogenmethylsiloxane copolymers, trimethylsiloxy-terminated hydrogenmethylsiloxane-octylhydrogensiloxane copolymers, trimethylsiloxy-terminated dimethylsiloxane-octylhydrogensiloxane copolymers, and trimethylsiloxy-terminated methyloctylsiloxane-hydrogenmethylsiloxane copolymers; butyl-containing organopolysiloxanes such as trimethylsiloxy-terminated dimethylsiloxane-butylhydrogensiloxane copolymers, trimethylsiloxy-terminated butylmethylsiloxane-hydrogenmethylsiloxane copolymers, and trimethylsiloxy-terminated dimethylsiloxane-butylmethylsiloxane-hydrogenmethylsiloxane copolymers. This component is added at 1 to 200 weight parts per 100 weight parts component (A).

Component (C) of the present invention is essential for equipping the composition of the present invention with storage stability at room temperature. This component is specifically but nonexhaustively exemplified by alkyne alcohols such as 3-methyl-1-butyn-3-ol, 3,5-dimethyl-1-hexyn-3ol, and phenylbutynol; ene-yne compounds such as 3-methyl-3-pentene-1-yne and 3,5-dimethyl-3-hexene-1-yne; and by tetramethyltetrahexenylcyclotetrasiloxane, and benzotriazole. This component should be added in a quantity that provides a practically useful pot life (use time). Because the reaction-inhibiting effect varies with the molecular structure of this component, the use quantity is not specifically restricted and the addition should be selected as desired. However, this component is in general added at 0.001 to 5 weight parts per 100 weight parts component (A).

The platinum group metal catalyst comprising component (D) of the present invention is a catalyst for the crosslinking and curing of components (A) and (B). This component is nonexhaustively exemplified by chloroplatinic acid, alcohol-modified chloroplatinic acid, chloroplatinic acid/olefin complexes, chloroplatinic acid/vinylsiloxane complexes, microparticulate platinum adsorbed on a particulate carbon carrier, platinum black, palladium catalysts, and rhodium catalysts. This component should be used in a catalytic quantity, that is, a quantity sufficient to effect the cure of the composition of the present invention. In order to effect curing of the composition of the present invention by brief treatment at temperatures not exceeding 100° C., this component is generally used within the range of 1 to 1,000 ppm as platinum metal per 100 weight parts component (A) and more preferably within the range of 10 to 300 ppm as platinum metal per 100 weight parts component (A).

The nonreactive organopolysiloxane comprising component (E) of the present invention is a component used on an optional basis to bring about further improvements in the release performance. After the composition of the present invention has been cured, this component is present in a free state in the cured product. This organopolysiloxane must not contain silicon-bonded alkenyl groups nor silocon-bonded hydrogen atoms, and it is preferably a liquid or gum at room temperature. The component under consideration is specifically but nonexhaustively exemplified by trimethylsiloxy-terminated dimethylpolysiloxanes, dimethylphenylsiloxy-terminated dimethylpolysiloxanes, and trimethylsiloxy-terminated dimethylsiloxane-methylphenylsiloxane copolymers. Trimethylsiloxy-terminated dimethylpolysiloxanes are preferred among the preceding. This component is added at 0 to 200 weight parts per 100 weight parts component (A) and preferably at 1 to 150 weight parts per 100 weight parts component (A).

The release film-forming organopolysiloxane composition of the present invention can be prepared simply by mixing the above-described components (A), (B), (C), and (D) or components (A) through (E) to homogeneity. In the case of application to the surface of a sheet-form substrate such as paper, synthetic film, polyethylene-laminated kraft paper, and so forth, the release film-forming organopolysiloxane composition of the present invention may be used directly without modification, or it may be diluted with an organic solvent capable of dissolving the instant composition. Such organic solvents are nonexhaustively exemplified by aromatic hydrocarbons such as toluene, xylene, and benzene; by hydrocarbons such as heptane, and hexane; and by chlorinated hydrocarbons such as trichloroethane, and perchloroethane.

The present invention is explained in greater detail below through illustrative examples. In these examples, "parts" denotes "weight parts", the viscosity is the value at 25° C., and "cs" is an abbreviation for centistokes. The curability, adherence, release resistance, and residual adhesiveness were measured by the following methods.

CURABILITY AND ADHERENCE

The organopolysiloxane release composition was coated to a thickness of approximately 1 micrometer (solids basis) on the surface of polyethylene-laminated kraft paper. The cured film was produced by heating this in a hot-air-circulation drier at the specified temperature. The surface of the resulting cured film was then forcefully rubbed with a finger 10 times (1 time=1 back-and-forth motion). The film was subsequently evaluated for dulling and delamination.

DULLING AND DELAMINATION

Dulling (smearing) was determined by coating the composition on the surface of a substrate and then curing the composition by heating. The surface of the obtained cured coating was then rubbed with a finger. Curing of the coating was determined to be unsatisfactory when cloudiness (smear) was observed after rubbing the surface of the cured coating. Delamination (rub off) was determined by vigorously rubbing the coating with the index finger and noting that the coating could not be removed from the paper, if rub off occurred adhesion by the coating to the substrate was determined to be unsatisfactory.

RELEASE RESISTANCE

The organopolysiloxane release composition was coated to a thickness of approximately 1 micrometer (solids basis) on the surface of polyethylene-laminated kraft paper. The cured film was produced by heating this in a hot-air-circulation drier at 90° C. for 30 seconds. The surface of the cured film was then coated with 25 g/m$^2$ (solids basis) of a rubber-based solvent-type pressure-sensitive adhesive (Oribine BPS2411, product of Toyo Ink Seizo Kabushiki Kaisha) followed by heating for 2 minutes at 100° C. In order to fabricate the measurement specimen, the treated surface was subsequently overlaid with backing paper (weight=55 g/m²) and this assembly was aged for 10 days at 25° C. under a load of 20 g/cm². This measurement specimen was cut to a width of 5 cm to give the test specimen. Using a tensile tester, the force (g) was measured that was necessary for tensile peeling of the backing paper from the test specimen at 180° and a tensile velocity of 30 cm/minute.

RESIDUAL ADHESIVENESS

A cured film of the organopolysiloxane composition was formed on the surface of polyethylene-laminated paper by the same method as for the release resistance. Polyester tape (Polyester Tape 31B, brandname of Nitto Denko Kabushiki Kaisha) was then adhered on the surface of the cured film. A load of 20 g/cm² was placed on this assembly and it was heated for 20 hours at 70° C. The tape was then peeled off and re-adhered on a stainless steel plate using a 2 kg rubber roller. The adhesive force (g) was subsequently measured by peeling off the tape using a tensile tester. Residual adhesiveness was measured using the following formula:

$$\text{residual adhesiveness (\%)} = \frac{\text{(residual adhesive force)}}{\text{(initial adhesive force)}} \times 100.$$

EXAMPLE I

The following were placed in a condenser-equipped 1,000 mL flask: 63 g (grams) trimethylsiloxy-terminated methylhydrogenpolysiloxane with viscosity=40 cs, 4 g trimethylsiloxy-terminated methyloctylpolysiloxane with viscosity=120 cs, 33 g octamethylcyclotetrasiloxane, and 3 g activated clay. An equilibration reaction was then run by heating for 5 hours at 80° C. while stirring under a nitrogen current. Filtration of the reaction product yielded 75 g trimethylsiloxy-terminated dimethylsiloxane-methyloctylsiloxane-methylhydrogensiloxane copolymer with viscosity=100 cs. The following were then dissolved in 700 weight parts toluene: 100 weight parts silanol-terminated dimethylsiloxane-hexenylmethylsiloxane copolymer gum (hexenylmethylsiloxane unit content=3 mol %), 20 weight parts of the trimethylsiloxy-terminated dimethylsiloxane-methyloctylsiloxane-methylhydrogensiloxane copolymer prepared as described above, 0.3 weight parts 3,5-dimethyl-1-hexyn-3-ol, and 100 weight parts silanol-terminated dimethylpolysiloxane gum. The release-film forming organopolysiloxane composition was finally prepared by dissolving sufficient chloroplatinic acid/divinyltetramethyldisiloxane complex into the preceding solution to give 120 ppm as platinum based on the total organopolysiloxane weight. The curability, adherence, release resistance, and residual adhesiveness were measured on this composition, and these results are reported in Table I.

EXAMPLE II

The following were placed in a condenser-equipped 1,000 mL flask: 63 g trimethylsiloxy-terminated methylhydrogenpolysiloxane with viscosity=40 cs, 4 g trimethylsiloxy-terminated methyloctylpolysiloxane with viscosity=120 cs, 33 g octamethylcyclotetrasiloxane, and 3 g activated clay. An equilibration reaction was then run by heating for 5 hours at 80° C. while stirring under a nitrogen current. Filtration of the reaction product yielded 75 g trimethylsiloxy-terminated dimethylsiloxane-methyloctylsiloxane-methylhydrogensiloxane copolymer with viscosity=100 cs. The following were then dissolved in 700 weight parts toluene: 100 weight parts silanol-terminated dimethylsiloxane-hexenylmethylsiloxane copolymer gum (hexenylmethylsiloxane unit content=3 mol %), 20 weight parts of the trimethylsiloxy-terminated dimethylsiloxane-methyloctylsiloxane-methylhydrogensiloxane copolymer prepared as described above, 0.3 weight parts 3,5-dimethyl-1-hexyn-3-ol, 100 weight parts silanol-terminated dimethylpolysiloxane gum, and 10 parts trimethylsiloxy-terminated dimethylpolysiloxane. The release-film forming organopolysiloxane composition was finally prepared by dissolving sufficient chloroplatinic acid/divinyltetramethyldisiloxane complex into the preceding solution to give 120 ppm as platinum based on the total organopolysiloxane weight. The curability, adherence, release resistance, and residual adhesiveness were measured on this composition, and these results are reported in Table I.

COMPARISON EXAMPLE I

A release film-forming organopolysiloxane composition was prepared as in Example I, but in this case using a trimethylsiloxy-terminated dimethylsiloxane-methylhydrogensiloxane copolymer with viscosity=40 cs in place of the trimethylsiloxy-terminated dimethylsiloxane-methyloctylsiloxane-methylhydrogensiloxane copolymer used in Example I. The properties of this composition were measured as in Example I, and these results are reported in Table I.

TABLE I

|  | Example I | | Example II | | Comparison Example I | |
|---|---|---|---|---|---|---|
| curing conditions | 90° C. 30 sec | 100° C. 20 sec | 90° C. 30 sec | 100° C. 20 sec | 90° C. 30 sec | 100° C. 20 sec |
| dulling | no | no | no | no | no | no |
| delamination | no | no | no | no | yes | yes |
| release resistance (g/5 cm) | 9.5 | | 9.2 | | 9.7 | |
| residual adhesive force (%) | 90 | | 89 | | 90 | |

It should be apparent from the foregoing that many other variations and modifications may be made in the compounds, compositions and methods described herein without departing substantially from the essential features and concepts of the present invention. Accordingly it should be clearly understood that the forms of the invention described herein are exemplary only and are not intended as limitations on the scope of the present invention as defined in the appended claims.

That which is claimed is:

1. A composition comprising:
   (A) 100 weight parts of an organopolysiloxane having at least 2 alkenyl groups having the general formula $H_2C=CH-(CH_2)_n-$ in each molecule, wherein n has a value of from 2 to 8;
   (B) 1 to 200 weight parts of an organohydrogenpolysiloxane selected from the group consisting of octyl-containing organohydrogensiloxanes and butyl-containing organohydrogensiloxanes;
   (C) an addition-reaction inhibitor;
   (D) a catalytic quantity of a platinum group metal catalyst.

2. A composition according to claim 1, wherein the composition further comprises (E) from 1 to 200 weight parts of a nonreactive organopolysiloxane.

3. A composition according to claim 1, wherein component (A) is selected from the group consisting of dimethylbutenylsiloxy-terminated dimethylpolysiloxanes, dimethylpentenylsiloxy-terminated dimethylpolysiloxanes, dimethylhexenylsiloxy-terminated dimethylpolysiloxanes, dimethylheptenylsiloxy-terminated dimethylpolysiloxanes, dimethyloctenylsiloxy-terminated dimethylpolysiloxanes, trimethylsiloxy-terminated butenylmethylsiloxane-dimethylsiloxane copolymers, silanol-terminated butenylmethylsiloxane-dimethylsiloxane copolymers, trimethylsiloxy-terminated methylpentenylsiloxane-dimethylsiloxane copolymers, trimethylsiloxy-terminated hexenylmethylsiloxane-dimethylsiloxane copolymers, silanol-terminated hexenylmethylsiloxane-dimethylsiloxane copolymers, trimethylsiloxy-terminated methylheptenylsiloxane-dimethylsiloxane copolymers, trimethylsiloxy-terminated methyloctenylsiloxane-dimethylsiloxane copolymers, dimethylpentenylsiloxy-terminated methylphenylsiloxane-dimethylsiloxane copolymers, silanol-terminated methylpentenylsiloxane-dimethylsiloxane copolymers, dimethylhexenylsiloxy-terminated hexenylmethylsiloxane-dimethylsiloxane copolymers, and dimethylhexenylsiloxy-terminated diphenylsiloxane-dimethylsiloxane copolymers.

4. A composition according to claim 1, wherein component (B) is selected from the group consisting of trimethylsiloxy-terminated methyloctylsiloxane-dimethylsiloxane-hydrogenmethylsiloxane copolymers, trimethylsiloxy-terminated hydrogenmethylsiloxane-octylhydrogensiloxane copolymers, trimethylsiloxy-terminated dimethylsiloxane-octylhydrogensiloxane copolymers, trimethylsiloxy-terminated methyloctylsiloxane-hydrogenmethylsiloxane copolymers, trimethylsiloxy-terminated dimethylsiloxane-butylhydrogensiloxane copolymers, trimethylsiloxy-terminated butylmethylsiloxane-hydrogenmethylsiloxane copolymers, and trimethylsiloxy-terminated dimethylsiloxane-butylmethylsiloxane-hydrogenmethylsiloxane copolymers.

5. A composition according to claim 1, wherein component (C) is selected from the group consisting of alkyne alcohols, ene-yne compounds, tetramethyltetrahexenylcyclotetrasiloxane, and benzotriazole.

6. A composition according to claim 5, wherein the alkyne alcohol is selected from the group consisting of 3-methyl-1-butyn-3-ol, 3,5-dimethyl-1-hexyn-3-ol, and phenylbutynol.

7. A composition according to claim 5, wherein the eneyne compound is selected from the group consisting of 3-methyl-3-pentene-1-yne and 3,5-dimethyl-3-hexene-1-yne.

8. A composition according to claim 1, wherein component (D) is selected from the group consisting of chloroplatinic acid, alcohol-modified chloroplatinic acid, chloroplatinic acid/olefin complexes, chloroplatinic acid/vinylsiloxane complexes, microparticulate platinum adsorbed on a particulate carbon carrier, platinum black, palladium catalysts, and rhodium catalysts.

9. A composition according to claim 2, wherein component (E) is selected from the group consisting of trimethylsiloxy-terminated dimethylpolysiloxanes, dimethylphenylsiloxy-terminated dimethylpolysiloxanes, and trimethylsiloxy-terminated dimethylsiloxane-methylphenylsiloxane copolymers.

10. A composition according to claim 9, wherein component (E) is a trimethylsiloxy-terminated dimethylpolysiloxane.

11. A method of making a cured release coating, the method comprising the steps of:
(I) mixing:
  (A) 100 weight parts of an organopolysiloxane having at least 2 alkenyl groups having the general formula $H_2C=CH-(CH_2)_n-$ in each molecule, wherein n has a value of from 2 to 8;
  (B) 1 to 200 weight parts of an organohydrogenpolysiloxane selected from the group consisting of octyl-containing organohydrogensiloxanes and butyl-containing organohydrogensiloxanes;
  (C) an addition-reaction inhibitor;
  (D) a catalytic quantity of a platinum group metal catalyst;
(II) applying the mixture of Step (I) to a solid substrate to form a coating; and
(III) exposing the coating to heat in an amount sufficient to cure the coating.

12. A method according to claim 11, wherein the method further comprises adding from 1 to 200 weight parts of a nonreactive organopolysiloxane prior to step (II).

13. A method according to claim 11, wherein the method further comprises dissolving the mixture from step (I) in an organic solvent prior to step (II).

14. A method according to claim 12, wherein the method further comprises dissolving the mixture from step (I) in an organic solvent prior to step (II).

15. A method according to claim 13, wherein the organic solvent is selected from the group consisting of toluene, xylene, benzene, heptane, hexane, trichloroethane, and perchloroethane.

16. A method according to claim 11, wherein the substrate is selected from the group consisting of paper, synthetic film, and polyethylene-laminated kraft paper.

17. A product produced in accordance with the method of claim 11.

18. A product produced in accordance with the method of claim 12.

19. A product produced in accordance with the method of claim 13.

20. A product produced in accordance with the method of claim 14.

* * * * *